Patented Feb. 20, 1951

2,542,743

UNITED STATES PATENT OFFICE 2,542,743

METHOD OF PURIFYING AND CLARIFYING WATER

Laurence E. Weymouth, Somerville, N. J., assignor to Johns-Manville Corporation, New York, N. Y., a corporation of New York No Drawing. Application January 25, 1947, Serial No. 724,459

3 Claims. (Cl. 210—23)

This invention relates to improved procedure for purifying and clarifying potable and industrial water.

An object of the invention is to provide a method for effecting economical and efficient clarification of water containing solid impurities.

A further object is to provide an improved method for regenerating used diatomaceous filter aid having as its principal contaminant a flocculent hydrate of a trivalent metal.

The present water purifying method includes flocculent precipitate clarification of water supplemented by practical use of diatomaceous earth filter aid filtration and by drying heat regeneration of the filter aid material for repeated use.

With the above objects in view, the invention consists in the improved method of purifying and clarifying water which is hereinafter described and more particularly defined in the accompanying claims.

The present method is initiated by forming within the water to be purified a flocculent precipitate comprising a hydroxide of a trivalent metal, such as aluminum hydroxide or ferric hydroxide. Precipitates of this nature function to enmesh finely divided solid impurities present in the water, so that removal of the precipitate by filtration or other means effects purification and clarification of the water. Owing to the gelatinous character of the flocculent precipitate, it is difficult to effect complete separation thereof from the treated water at a high filtration flow rate. According to the present method, separation of the flocculent precipitate, together with solid impurities entrapped therewith, is effected by filtration through a coarse grade of diatomaceous filter aid material. The solid impurities removed from the water are trapped in the metal hydrate flocks rather than being deposited on the surfaces of the diatom particles. A heat drying operation is carried out on the wet filter cake which is not designed to eliminate such trapped impurities, but which is adapted for treating the metal hydroxide flocks to destroy their gel character so that their presence does not seriously interfere with the filtering properties of the thus regenerated diatomaceous filter aid. This last step of moderate drying heat regeneration of a mixture of diatomaceous filter aid and flocculent trivalent metal hydroxide precipitate entrapped therewith, converts the flocculent precipitate to a substantially anhydrous oxide, which permits of reuse of the regenerated filter aid material without separation of said oxide and without serious adverse effect on the filtering efficiency of the diatomaceous filter aid. The total consumption of filter aid material for clarifying water can thus be reduced to about one-fifth to one-tenth or less of that which would be required with no regeneration and reuse.

Preferred practice in the purification of a water containing suspended impurities is to subject the water to a flocculation and settling treatment prior to filtration. In the flocculation treatment, chemicals are introduced into the water to be clarified in such a way that a flocculent precipitate will be formed in situ. Thus a precipitate of flocculent aluminum hydroxide may be formed by introducing to the water, with agitation, suitable amounts of a soluble aluminum salt such as alum, and soluble alkali such as soda ash which reacts with the alum to precipitate the hydroxide in flocculent state. It is desirable to subject the water and added chemicals to mild agitation for a short period of time to permit the aluminum hydroxide flocks to reach their maximum size. After formation of the flocculent precipitate in situ within the water, it is desirable to subject the suspension of water and flocculent precipitate to quiescent settling for a period of about one hour, thus allowing a major proportion of the flocculent precipitate to settle out of suspension, thereby reducing the amount of flocculent precipitate which it is necessary to remove by filtration.

While a major proportion of the solid impurities and the aluminum hydroxide flock can be separated from the water by gravity settling prior to filtration, some of the aluminum hydroxide flock remains in suspension in the partially clarified water which is preferably drawn off from a point near the top of the settling tank, and it is this flock which is the principal residual contaminant in the water which is subjected to filtration. After the flocculation and settling treatment, the partially clarified water is admixed with a coarse grade of diatomaceous filter aid material, and the suspension thus formed is subjected to pressure filtration through a filter precoat of the diatomaceous filter aid. Although the amount of flock retained by the partially clarified water after the settling treatment is usually small, and may represent only ½–1% of the weight of diatomaceous filter aid which is added to the water at this point in the treatment, even this small amount of aluminum hydroxide flock has the effect of substantially retarding the rate of filtration of the water through the filter as the flock contaminated diatomaceous silica builds up into a filter cake. If the filter aid material in the filter cake which is thus formed is reused in the filtration of additional water without any regeneration treatment, the rate of filtration is rapidly retarded by the presence of larger amounts of the aluminum hydroxide flock, so that reuse of the untreated diatomaceous filter aid to any great extent becomes impractical. However, when the filter cake is subjected to a conventional heat drying operation at temperatures within the range 220–600° F. for a period of time sufficient to reduce the water content to not substantially more than 2%, the gelling character of the flock is thereby practically destroyed, since the resulting alumina particles do not rehydrate appreciably under the usual conditions of filter aid reuse.

In a series of flocculation settling and filtration runs on river water, in which the water was first flocculated with alum and soda ash, allowed to settle, and the partially clarified water then admixed with said coarse filter aid and subjected to pressure filtration, reuse of the recovered filter aid four times, without drying, developed such retardation of the rate of filtration that the filter aid during the fourth reuse exhibited only 18% of its original flow rate efficiency. When this operation was repeated employing as a filter aid the original diatomaceous silica-alum flock mixture, after drying to reduce its water content below 2%, the resulting dry filter aid material after the fourth reuse still exhibited a flow rate as high as that of the original fresh uncontaminated diatomaceous filter aid material, with equal clarification.

Suitable coarse grades of diatomaceous filter aid material classify as to size within the range 10–20% by weight coarser than 40 microns, 20–35% between 40–20 microns, 30–35% between 10 and 20 microns, 16–22% between 6 and 10 microns, 2–15% between 2 and 6 microns, and not more than 2% smaller than 2 microns.

The method has proven satisfactory for clarifying water such as river water containing 10 to 300 parts per million of solid organic and inorganic impurities, to reduce the impurity content to less than 0.1 parts per million. A suitable volume of flocculent precipitate for clarifying 3000 gallons of water is obtained by reacting about 2 lbs. of ammonium alum and 2–3 ounces of soda ash. The pH of water thus treated approximates about 6.0. The initial flocculation and settling period should extend over a period of at least 1 hour to permit separation of most of the aluminum hydroxide flock by settling. During the first 10–20 minutes of this period the chemically treated water is preferably agitated as a means of developing voluminous flocks.

A few minutes prior to termination of the settling preiod a suspension of about 1.25 lbs. of the coarse grade of diatomaceous filter aid in clear water is circulated from a pre-coating tank through the filter bed to deposit a precoat on a filter having an area of about 10 square feet. After cutting off connections between the precoat tank and the filter, partially clarified water is preferably drawn off from a point near the top of the settling tank, additional coarse diatomaceous filter aid material is admixed therewith in the proportion of about 1 pound of such filter aid for each 2400 gallons of partially clarified water, and the slurry thus formed is passed through the filter under several pounds gauge pressure, at the rate of about 60–90 gallons per minute. The filter cake thus deposited is preferably removed from the filter by back washing with clear water and the contaminated filter aid is recovered from a concentrated water slurry, as by settling and on a suction filter. The drying operation may be carried out in an oven at temperatures within the range 220–600° F. for a period of time sufficient to reduce the combined water content of the hydrated alumina contaminant to not substantially more than 8%. Drying regeneration within the indicated temperature limits avoids difficulties with structural breakdown of the diatom structure such as occurs under high temperatures.

On repeated regeneration and reuse of the contaminated filter aid the amount of accumulated impurities builds up to such an extent that it is desirable to discard the contaminated filter aid and replace it with fresh filter aid. The contaminated filter aid is useful up to a degree of contamination amounting to about 10% by weight of finely divided dehydrated alumina and impurities. There is some advantage in an operating cycle in which a small proportion of fresh diatomaceous filter aid is added at the beginning of each run. For example, about 5–10% by weight of fresh filter aid may be added to the regenerated filter aid on each filtration run, while discarding a corresponding amount of the used filter aid. This fresh filter aid may be added to the pre-coat before each filter run, limiting the total amount of pre-coat to about 1.25 lbs. for a run handling 2400–3000 gallons of water. It has been found that with proper flocculation and separation of a major proportion of the flocculent precipitate from the partially clarified water by settling, it is possible to reuse the heat regenerated filter aid material as much as 8 to 10 times, or more, without suffering any serious drop in efficiency. With suitable separation of a major proportion of the flocculent precipitate by settling, the amount of flock which is trapped within the filter during a complete filter clarifying run usually represents only ½–1% by weight of the diatomaceous filter aid in the resulting filter cake.

The heat regeneration of the filter cake can be made substantially continuous and automatic. The concentrated slurry obtained by back washing the cake can be fed continuously to a thickener, and the underflow from the thickener, in the form of a concentrated slurry, is then filtered on a continuous vacuum filter of the rotating drum type. The cake from the vacuum filter can then be dried in a continuous dryer. There is no necessity of pulverizing the dry cake because the lumped cake material readily disperses in water by moderate mechanical agitation in making up a slurry for reuse of the filter aid material.

The invention which has been thus described by detailed example is not limited as to such details and it is to be understood that variations, changes and modifications are contemplated within the scope of the invention as defined by the following claims.

What I claim is:

1. A process of clarifying water containing solid impurities which comprises, regenerating a coarse grade of diatomaceous filter aid containing flocculent aluminum hydrate as a contaminant by heating at a temperature of 220–600° F. for a period of time sufficient to substantially dehydrate the aluminum hydrate, agitating the water while adding thereto reactive proportions of alum and soda ash, thereby developing within the water a flocculent precipitate of aluminum hydroxide, allowing the suspension thus formed to stand quiescent to effect separation of a major proportion of the precipitate from the partially clarified water by settling, admixing a coarse grade of regenerated diatomaceous filter aid with the thus partially clarified water, and filtering the resulting slurry through a pre-coat bed of said filter aid.

2. In clarifying water containing solid impurities the steps comprising, regenerating a coarse grade of diatomaceous filter aid containing flocculent aluminum hydrate as a contaminant by heating at a temperature of 220–600° F. for a period of time sufficient to substantially dehydrate the aluminum hydrate, forming in the water a flocculent precipitate of aluminum hydrate, separating a major portion of the precipitate from the partially clarified water by quiescent settling, admixing said regenerated diatomaceous filter aid with the partially clarified water containing residual flock in suspension, and filtering the resulting slurry through a bed of said filter aid.

3. A process of clarifying water as defined in claim 2, in which a major portion, but not all, of the thus recontaminated filter aid is again regenerated and is reused in the process in admixture with added uncontaminated diatomaceous filter aid.

LAURENCE E. WEYMOUTH.

REFERENCES CITED

The following references are of record in the file of this patent:

UNITED STATES PATENTS

| Number | Name | Date |
|---|---|---|
| 739,473 | Bachman | Sept. 22, 1903 |
| 1,156,466 | Claus | Oct. 12, 1915 |
| 1,332,113 | Dutt | Feb. 24, 1920 |
| 1,509,325 | Weir et al. | Sept. 23, 1924 |
| 1,533,032 | Sauer | Apr. 7, 1925 |
| 1,617,014 | Derleth | Feb. 8, 1927 |
| 1,868,869 | Barnitt | July 26, 1932 |
| 2,084,419 | Wallis et al. | June 22, 1937 |
| 2,267,831 | Liebknecht | Dec. 30, 1941 |
| 2,294,697 | Seip | Sept. 1, 1942 |
| 2,358,509 | Hirsch | Sept. 19, 1944 |
| 2,388,616 | La Lande, Jr. | Nov. 6, 1945 |